Jan. 1, 1957     J. VAN ACKEREN     2,776,021
METHOD AND APPARATUS FOR NAPHTHALENE ABSORPTION
Filed Nov. 18, 1952
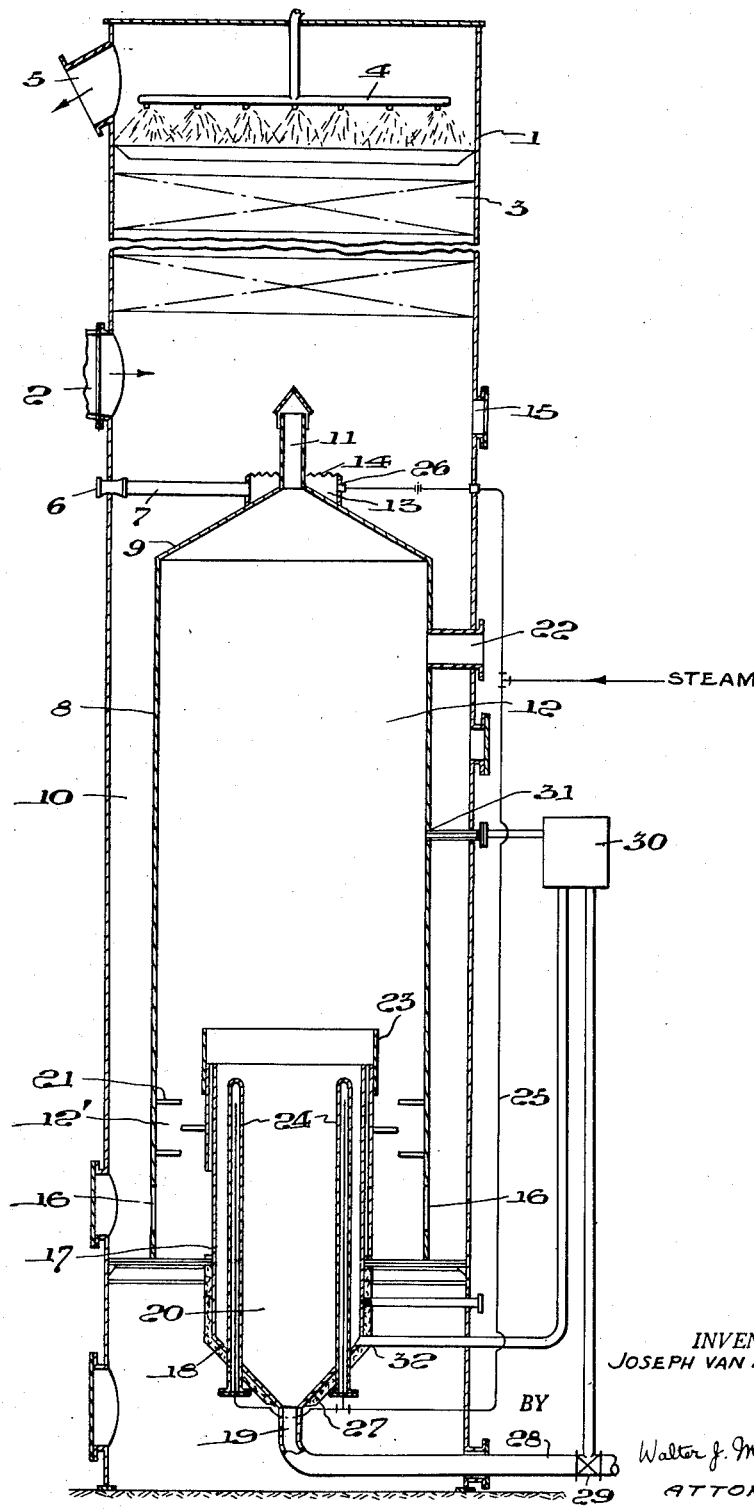
INVENTOR.
JOSEPH VAN ACKEREN
BY
Walter J. Monacelli
ATTORNEY United States Patent Office 2,776,021
Patented Jan. 1, 1957

2,776,021

METHOD AND APPARATUS FOR NAPHTHALENE ABSORPTION

Joseph van Ackeren, Pittsburgh, Pa., assignor to Koppers Company, Inc., a corporation of Delaware Application November 18, 1952, Serial No. 321,249

14 Claims. (Cl. 183—3)

The present invention relates to apparatus, and a method for the removal of a substance contained in one liquid by contacting it with an immiscible liquid of different density. In general, a substance present in some form, i. e. admixed, dissolved or suspended, in a first liquid is absorbed by a second immiscible liquid of different density when the second liquid is brought into contact with the first liquid by means of an apparatus of this invention.

More specifically, the present invention contemplates the absorption of a substance such as naphthalene from the gas cooling water of a final cooler in a by-product coking train by bringing the spent cooling water into contact with a liquid of greater density, such as tar, and absorbing the naphthalene that is present in the spent cooling water in the liquid of greater density.

In coke-oven by-product recovery practice, gas from a coke oven battery is first passed through primary coolers and separators for the separation of pitch and tar in the usual manner and then is conveyed through a sulfuric acid saturator for the purpose of removing the contained ammonia. After the gas leaves the saturator it is carried to a final cooler where its temperature is reduced for efficient light oil removal in the benzol washers which normally follow the final cooler.

Most of the present day final coolers are of the direct contact type in which water is sprayed into the top of a cylindrical cooler that is packed with wooden grids. In a well designed cooler, the gas enters the cooler usually within a temperature range of 40° to 60° C., flows countercurrent through the cooling water and leaves the cooler at a lower temperature which is within a few degrees of the incoming water temperature.

In thus cooling the gas by direct contact with the water, appreciable quantities of naphthalene are usually precipitated or condensed from the gas and substantial amounts of $H_2S$, HCN, phenol, and other water-soluble components in the gas are absorbed in the water. In many localities, the discharge of water contaminated with these materials is not permissible, so the water from the final cooler is generally cooled and recirculated. There is sufficient naphthalene present in the spent water as a result of precipitation or condensation in the final cooler to plug the recirculating water lines and cooling equipment, and therefore, it is necessary to remove the naphthalene from the water before cooling and recirculation.

An early system that was used to remove the naphthalene provided a large settling sump for the water leaving the final cooler. Most of the naphthalene rose to the surface of the water in the sump where it was skimmed off and recovered. However, since the specific gravity of the condensed naphthalene is very close to that of water and since the quantity of impurities in the naphthalene varies and accordingly affects the specific gravity of the naphthalene, some of the naphthalene is carried to the bottom of the sump and carried out with the water, resulting in stoppages in other parts of the system.

To obviate these difficulties, another system has been provided wherein the water containing the precipitated naphthalene flows downwardly through a water downcomer disposed in the lower central portion of the cylindrical cooling tower. The water flows through a communicating passage near the base of the downcomer and then upward into an outer annular chamber formed between the wall of the cylindrical tower and the outer surface of the water downcomer wall. Tar is pumped into the upper portion of the outer annular chamber, which serves as a tar absorption or settling section, so that the tar which has a greater density than water flows in a downward direction countercurrent to the water and is removed at a tar outlet connection at the base of the outer annular chamber.

This system of naphthalene removal functions well from the point of view of efficient naphthalene removal. Frequently, however, the tar is carried over with the water overflowing from the top of the outer annular chamber and water is carried out with the tar leaving the base of the outer chamber.

In order to reduce the amount of water carried over with the tar and the amount of tar carried over with the water, a system has now been developed that incorporates the desirable features needed for efficient naphthalene removal by either batchwise or continuous operation and that eliminates the disadvantages of the previous systems heretofore mentioned. The present invention avoids the disadvantages of the previously used systems and provides an efficient, easy to operate apparatus that contemplates a uniform distribution of the liquid of greater density, use of a large settling space for effective separation of the liquids and permits a minimum liquid velocity, reducing to a minimum the possibility of carrying one liquid out with the other.

The invention comprises a final cooler system which includes apparatus comprising a liquid introduction chamber, a first liquid inlet in the upper portion of said introduction chamber, a second liquid inlet in the upper portion of said introduction chamber for an immiscible liquid of different density than the first liquid, a second chamber communicating at its lower portion with the lower portion of said introduction chamber so that the liquids flowing from said introduction chamber will enter the second chamber. In the second chamber, the liquid of lesser density, which passes to this second chamber when its hydrostatic head becomes sufficiently high in the introduction chamber to allow it to do so, will flow upwardly through the liquid of greater density, the substance to be absorbed in one of the liquids being absorbed by the other immiscible liquid of different density. The second chamber has a liquid outlet in its upper portion through which the liquid of lesser density passes off. In addition, a settling chamber is provided communicating with the second chamber and there is a liquid outlet in the settling chamber so that when the liquid of greater density flows to the settling chamber, it may be passed off through this liquid outlet.

According to one embodiment of the invention a liquid overflow weir is provided communicating with the second liquid inlet in the introduction chamber to assure a relatively uniform distribution of the second immiscible liquid into the introduction chamber.

According to another embodiment of the invention a plurality of baffles are provided in the lower contacting portion of the second chamber so that the inflowing liquids will be intimately mixed.

According to another embodiment of the invention, an adjustable weir is provided on the upper portion of the separating chamber to permit adjustment of the contacting space for the liquids.

According to another embodiment of the invention, heating elements are provided in the settling chamber to keep the settling liquid of greater density at sufficiently high temperatures that its viscosity will be low enough to permit efficient liquid transfer.

And, according to still another embodiment of the invention, automatic controller means is provided to regulate the quantity of liquid leaving the separating chamber.

It is obvious that various changes can be made by one skilled in the art in the arrangement, form, construction and type of the various elements disclosed without departing from the scope or spirit of this invention. Thus, for example, a plurality of spaced nozzles or jets may be used instead of the liquid overflow weir aforementioned and a sheet or sheets of foraminous material may be used in place of baffles to insure intimate mixing of the liquids. Furthermore, it is within the contemplation of this invention to provide overflow ports in the various chambers where they might be needed.

Reference will now be made to the accompanying drawing which illustrates and exemplifies the embodiment of the apparatus of the invention in a preferred type of construction.

In accordance with the drawing, the reference numeral 1 indicates a cylindrical tower of conventional type. The tower 1 has a gas inlet 2 positioned in the midportion thereof and a gas outlet 5 in the upper portion of the tower. Across the top of the tower 1 are positioned spray nozzles 4 which are of conventional type and are so arranged as to assure uniform distribution of the incoming liquid. A plurality of distributing or deflecting baffles 3 (schematically indicated) are positioned in the upper portion of the tower between the gas inlet 2 and gas outlet 5, and below the liquid spray nozzles 4. Positioned within the lower portion of cylindrical tower 1 and below the gas inlet 2 is a cylindrical wall 8, terminating at its upper end in a conical top 9 and having a vent pipe 11 projecting therefrom. The outer surface of the cylindrical wall 8 and the inner surface of the wall of the cylindrical tower 1 define an outer annular chamber 10 which serves as a liquid introduction chamber. The inner surface of cylindrical wall 8 defines a second or inner chamber 12, a portion 12' of which together with the space immediately thereabove serves as a liquid contacting chamber. The upper portion of inner chamber 12 provides a space wherein the inflowing liquid of lesser density has minimum velocity which allows the entrained liquid of greater density to be separated therefrom. The vent pipe 11 permits the escape of any gases which may collect in the inner chamber 12. Superposed the conical top 9 and surrounding the vent pipe 11 is a cylindrically shaped overflow weir 13. The overflow weir 13 is connected by a pipe 7 to a second liquid inlet 6 positioned in the side of the cylindrical tower 1 below the gas inlet 2 and above the outer annular chamber 10. The inlet 6 permits the introduction of a second immiscible liquid which is of different density than the liquid that is sprayed through nozzles 4 in the upper part of the tower. The overflow weir 13 has a serrated top edge 14 which assures a relatively uniform distribution of the second liquid into the outer annular introduction chamber 10. Positioned above the outer annular chamber 10 and below the gas inlet level in the wall of cylindrical tower 1 is an emergency overflow outlet 15 which is provided to prevent the liquids from building up in the outer chamber above the gas inlet.

The cylindrical wall 8 has a number of passages 16 in the lower portion thereof which provide communication ways between outer annular introduction chamber 10 and the second or inner chamber 12, allowing the liquids to flow from the introduction chamber to the second chamber.

Positioned within the lower portion of the chamber 12 is a cylindrical wall 17 that terminates at its lower end in a conically shaped bottom 18 having an outlet opening 19. The inner surface of the cylindrical wall 17 defines a settling chamber 20 which opens at its upper end to inner chamber 12. The outer surface of cylindrical wall 17 and the inner surface of cylindrical wall 8 define an annular contacting portion 12' in the lower portion of inner chamber 12. Baffles 21 are provided in this annular section 12' to assure intimate mixing of the liquids passing therethrough. In the upper portion of inner chamber 12 is positioned a liquid outlet 22 for the liquid that passes through the liquid of greater density in the contacting chamber.

At the top of settling chamber 20, an adjustable weir 23 is provided in order to permit adjustment of the contacting space between the mixed liquids. The adjustment device (not shown in the drawings) can be one of a number of devices suitable for adjusting and holding one structural member in relationship to another structural member. For example, a plurality of vertical bolt hole rows can be provided on the periphery of the weir 23 with nuts and bolts cooperating as a seal with each hole. Selection of an identical bolt in each row to cooperate with holes positioned on the upper periphery of chamber 20 permits height adjustment. The settling chamber is further provided with a plurality of heating pipes 24 to keep the liquid of greater density at a sufficiently high temperature so that it will be flowable. Steam-out lines 25 lead to these heating pipes and are connected to the overflow weir 13 at 26 to prevent any clogging of the liquid in the overflow weir. The bottom portion of chamber 20 is provided with insulation 27 to provide for uniform liquid temperatures in that chamber.

Communicating with liquid outlet 19 in the settling chamber 20 is a pipe 28 having a valve 29 therein. The opening and closing of this valve 29 is regulated by an automatic controller 30 of known type and schematically illustrated in the drawings. The controller is designed to regulate the flow of the liquid leaving the chamber 20 so as to control the level of the liquid of greater density in the chambers 12 and 20. This can be accomplished by the use of a system having an air blowback. The system measures the difference in pressures between the point 31 in the chamber 12 and a point 32 in the settling chamber 20. Any increase in the pressure difference between these two points will be due to a higher percentage of liquid of greater density in the chambers, and the controller will correct this condition by opening valve 29. A lower difference in pressure between these two points caused by a lower proportion of immiscible liquid of greater density than desired, will cause the controller to close the valve 29.

By way of example, the operation of the invention is described in one of its preferred embodiments, namely, as a final cooling tower in a by-product coking train. The coke oven gas after it has passed through the various stages of the by-product train enters gas inlet 2 and flows upwardly in the tower through deflecting baffles 3. As the gas passes upwardly, it comes in contact with downflowing cooling water from spray nozzles 4. The cooling water cools the upflowing gases which pass out through outlet 5 and condenses the naphthalene vapors present in the gas, carrying the naphthalene downwardly with the water as it flows into the introduction chamber 10. Tar is introduced with the naphthalene-bearing water into the chamber 10, the quantity of tar introduced being broadly between 0.5 and 10% and preferably between 1 and 4% by volume of the water introduced. The quantity of water passing through the final cooler broadly ranges from 15 to 70 gallons and preferably is between 25 and 50 gallons of water per thousand cubic feet of gas. The tar collects near the bottom of the introduction chamber and flows through passages 16 into the annular contacting portion 12' of chamber 12. When the water head is sufficiently high in the introduction chamber 10 the tar level in the chamber will be forced by this water head down below the level of the uppermost part of passages 16 and naphthalene-bearing water will flow into the annular contacting portion 12' of chamber 12 and upwardly through the immiscible tar of greater density, guided by baffles 21 which assure proper mixing of the tar and water, allowing the naphthalene in the water to be absorbed by the tar. After the water passes the top of adjustable weir 23, the space from this point to the water outlet 22 is free of baffles or other obstructions, providing the maximum settling time and minimum water velocity, to reduce to a minimum the possibility of carrying tar out with the water through outlet 22.

The tar builds up in the annular contacting portion 12' of chamber 12 until it reaches the top of adjustable weir 23. The tar above this point is permitted to flow downwardly into the settling chamber 20 where it is not disturbed by mixing with the water flow. The tar is kept heated in the chamber by heating pipes 24 and the insulation 27 around the bottom of the settling chamber 20 provides for uniform tar temperatures.

The automatic controller 30 regulates the quantity of tar, which has absorbed the naphthalene from the water, that leaves the settling chamber 20 through outlet 19 so as to maintain a constant proportion of tar and water present in chambers 12 and 20.

While the description and drawings illustrate particular embodiments of the invention, various modifications within the language of the description and claims are intended to be claimed herein.

The invention claimed is:

1. Apparatus for absorbing a substance present in one liquid by contacting said liquid with an immiscible absorptive liquid of different density, comprising a liquid introduction chamber, a liquid inlet in the upper portion of said introduction chamber for a first liquid, a second liquid inlet in the upper portion of said introduction chamber for a second immiscible liquid of different density than the first liquid, a second chamber communicating at its lower portion with the lower portion of said introduction chamber so that the liquids flowing from said introduction chamber will enter the second chamber and the liquid of lesser density will flow through the liquid of greater density when the hydrostatic head of the liquid of lesser density in the introduction chamber becomes sufficiently high to allow it to pass to said second chamber, the substance present in one liquid being absorbed by the other immiscible liquid of different density, said second chamber having a liquid outlet in its upper portion through which the liquid of lesser density passes off, a settling chamber communicating with the second chamber, and a liquid outlet in the settling chamber for the removal of the liquid of greater density.

2. Apparatus for absorbing a substance present in one liquid by contacting said liquid with an immiscible absorptive liquid of different density, comprising a liquid introduction chamber, a liquid inlet in the upper portion of said introduction chamber for a first liquid, a second liquid inlet in the upper portion of said introduction chamber for a second immiscible liquid of different density than the first liquid, a second chamber positioned within said introduction chamber and communicating at its lower portion with the lower portion of said introduction chamber so that the liquids flowing from said introduction chamber will enter the second chamber and the liquid of lesser density will flow upwardly through the liquid of greater density when the hydrostatic head of the liquid of lesser density in the introduction chamber becomes sufficiently high to allow it to pass to said second chamber, the substance present in one liquid being absorbed by the other immiscible liquid of different density, said second chamber having a liquid outlet in its upper portion through which the liquid of lesser density passes off, a settling chamber positioned within the lower portion of said second chamber and having its upper portion communicating with the adjacent portion of the second chamber, and a liquid outlet in the lower portion of the settling chamber for the removal of the liquid of greater density.

3. Apparatus for absorbing a substance present in one liquid by contacting said liquid with an immiscible absorptive liquid of different density, comprising a cylindrical tower, a liquid inlet in the upper portion of said tower for a first liquid, a second liquid inlet in the upper portion of said tower for a second immiscible liquid of different density, a first cylindrical wall terminating at its upper end in a vented top, said first cylindrical wall disposed within said cylindrical tower so as to define an inner chamber and an outer annular introduction chamber between its outer surface and the inner surface of the wall of said tower through which annular chamber the liquids may pass downwardly, a second cylindrical wall positioned within the lower portion of the inner chamber defined by said first cylindrical wall so as to define an annular contacting portion of said chamber between its outer surface and the inner surface of the first cylindrical wall, having at least one passage at its lower portion communicating with the lower portion of said outer annular introduction chamber, said inner chamber having a liquid outlet in its upper portion for the removal of liquid of lesser density, the inner surface of said second cylindrical wall defining a settling chamber surrounded by the annular contacting chamber, said settling chamber communicating at its upper open end with said inner chamber at a level below the liquid outlet of said inner chamber and having a liquid outlet for the liquid of greater density.

4. The apparatus of claim 3, in which said vented top is conical and has positioned immediately thereabove a cylindrical liquid-overflow weir, and in which said second liquid inlet in the upper portion of said tower comprises a conduit passing through the side of said cylindrical tower, said conduit connecting with said weir, said cylindrical overflow weir opening at the top and having a plurality of serrations around its upper edge.

5. The apparatus of claim 4 and a plurality of baffles positioned in the annular contacting portion of said inner chamber.

6. The apparatus of claim 5 and a vertically adjustable cylindrical wall positioned at the upper portion of said second cylindrical wall so as to provide an adjustable weir for said annular contacting portion of said inner chamber.

7. The apparatus of claim 6 and a plurality of steam heating elements positioned in said settling chamber so that the liquid of greater density will be kept at sufficiently high temperatures to permit efficient liquid transfer.

8. The apparatus of claim 7 and an automatic controller means adapted to regulate the quantity of liquid leaving the liquid outlet of the settling chamber in accordance with the difference in pressure between a point in the inner chamber and a point in the settling chamber.

9. Apparatus for contacting a gas with a first liquid and absorbing from said first liquid a substance removed from the gas and present in the first liquid by contact with another immiscible liquid of different density, comprising a cylindrical tower, a gas inlet approximately in the mid portion of said tower, a gas outlet in said tower above said gas inlet, a first liquid inlet in the upper portion of said tower above the gas inlet, deflecting means between said gas inlet and said first liquid inlet, a second liquid inlet for a second immiscible liquid of different density positioned below the gas inlet, a first cylindrical wall terminating at its upper end in a vented conical top, said first cylindrical wall disposed in the lower portion of said cylindrical tower so as to define an inner chamber and an outer annular introduction chamber between the outer surface of said first cylindrical wall and the inner surface of the wall of said tower, a second cylindrical wall positioned within the lower portion of the inner chamber defined by said first cylindrical wall so as to define an annular contacting portion of said chamber between the outer surface of said second cylindrical wall and the inner surface of the first cylindrical wall, said chamber having at least one passage at its lower portion communicating with the lower portion of said outer annular introduction chamber, said inner chamber having a liquid outlet in its upper portion for the removal of liquid of lesser density, the inner surface of said second cylindrical wall defining a settling chamber surrounded by the annular contacting chamber, said settling chamber communicating at its open end with said inner chamber at a level below the liquid outlet of said inner chamber and having a liquid outlet for liquid of greater density.

10. A process of removing naphthalene from coke oven gas in a by-product train comprising the steps of contacting the naphthalene-bearing gas in a first zone with a first liquid thereby condensing naphthalene vapors present in the gas as a precipitate in said first liquid, introducing into said first zone a second immiscible liquid of greater density in concurrent downward flow with said naphthalene-bearing first liquid, directing the combined flow of liquids from the lower portion of said first zone initially into the lower portion of a second zone to flow in an upward direction in said second zone and bringing them into intimate contact as they flow upwardly in said second zone so that said first liquid will pass through said second immiscible liquid of greater density which absorbs the naphthalene from said first liquid, allowing said second liquid of greater density to settle below said first liquid in a third zone, and separating said liquids.

11. A process of removing naphthalene from coke oven gas in a by-product train comprising the steps of contacting the naphthalene-bearing gas in a first zone with cooling water thereby condensing naphthalene into said cooling water, introducing tar into said first zone which has a greater density than the water in a concurrent downward flow with the naphthalene-bearing water, directing the combined flow of tar and water from the lower portion of said first zone initially into the lower portion of a second zone to flow in an upward direction in said second zone and bringing them into intimate contact as they flow upwardly in said second zone so that the water will pass through the tar which absorbs the naphthalene contained in the water, allowing the tar to settle below the water in a third zone, and separating said liquids.

12. A process as described in claim 11 and the step of heating the tar as it settles from the water passing therethrough in the second zone so that its viscosity will be kept low enough to permit efficient liquid transfer.

13. The process as described in claim 12 and the step of regulating the amount of tar that is run off so as to maintain a constant average density of combined water and tar that is allowed to settle.

14. A process of removing naphthalene from naphthalene-bearing water comprising the steps of introducing tar which has a greater density than water in a concurrent downward flow with the naphthalene-bearing water in a first zone, directing the combined flow of tar and water from the lower portion of said first zone initially into the lower portion of a second zone to flow in an upward directin in said second zone, and bringing them into intimate contact as they flow upwardly in said second zone so that the water will pass through the tar which absorbs the naphthalene allowing the tar of greater density to settle below the water in a third zone, and separating said liquids.

References Cited in the file of this patent
UNITED STATES PATENTS

| | | |
|---|---|---|
| 1,578,687 | Sperr | Mar. 30, 1926 |
| 1,684,489 | Halloran | Sept. 18, 1928 |
| 1,830,178 | Sperr | Nov. 3, 1931 |
| 1,869,758 | Lungstras | Aug. 2, 1932 |
| 2,428,082 | King et al. | Sept. 30, 1947 |
| 2,630,376 | Dunn | Mar. 3, 1953 |
| 2,699,225 | Dahlbeck | Jan. 11, 1955 |